April 1, 1952     J. N. MARTIN     2,591,174
WELL PUMP VALVE
Filed Feb. 12, 1946
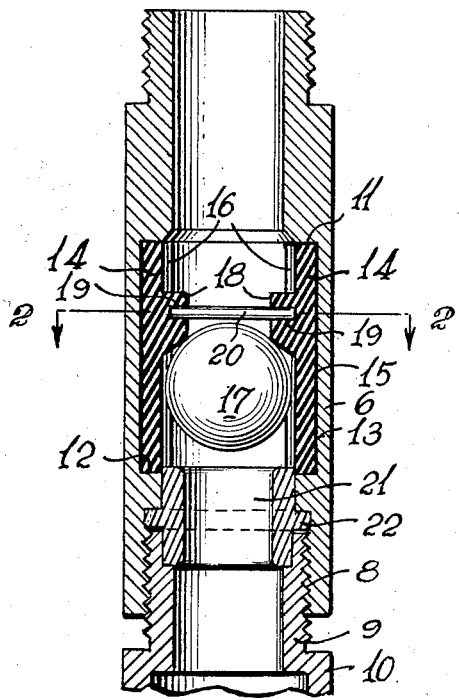
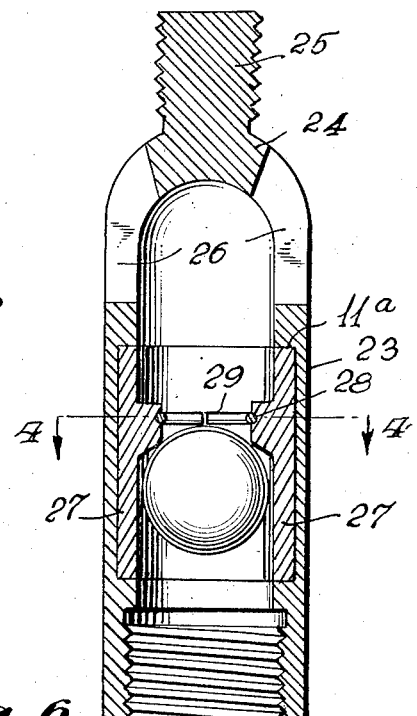
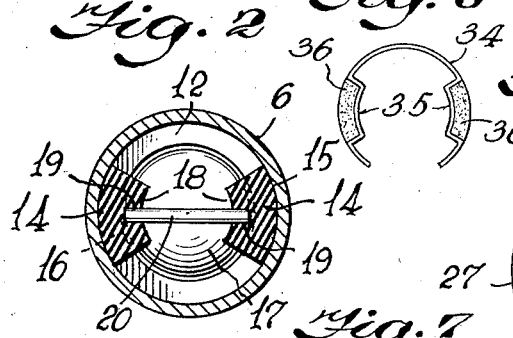
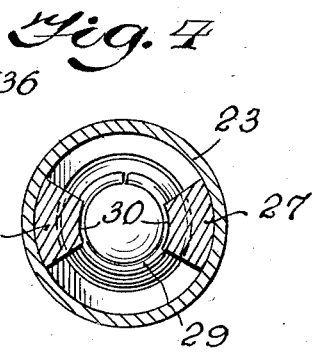
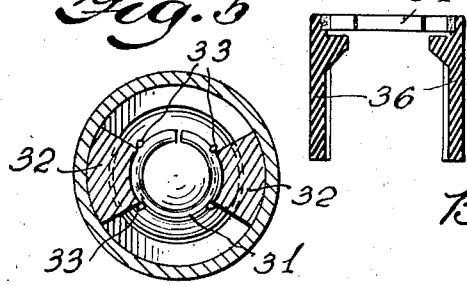
INVENTOR
John N. Martin,
BY
Barry & Cyr.
ATTORNEYS Patented Apr. 1, 1952

2,591,174

UNITED STATES PATENT OFFICE 2,591,174

WELL PUMP VALVE

John N. Martin, Tulsa, Okla.

Application February 12, 1946, Serial No. 647,036

10 Claims. (Cl. 251—121)

This invention pertains to well-pump valves, and more particularly to guide liners and the cages of ball valves and drop valves of the type used in the flow string of a well.

There are two general types of cages in use, the open type and the closed type, and they are provided with guides or liners for the ball or drop. To withstand the beating action of the ball or drop, manufacturers have adopted harder metals, heat treatment, lining ball guides or wings with hard metals, such as Stellite, and similar materials. Instead of employing harder or heat-treated metals for guiding the active members of such valves, I provide an elastic liner for guiding purposes, comprising a synthetic rubber compound, such as one of the Hycars, which is not affected by oil, and has a high resistance to abrasion. Such a guide will not "beat out" and will last much longer than the non-resilient metal guides previously employed. In improving liners or guides of the resilient type, I have also improved the cage and means for retaining the guide members within the same and have discovered that such improvements may be employed with either resilient or non-resilient guide members, as such members may, in accordance with the invention, be readily introduced into or removed from the cage, and when in position in the cage, will be retained firmly in place.

The invention will now be disclosed in connection with the accompanying drawing, in which:

Fig. 1 is a longitudinal vertical sectional view of a closed type valve cage provided with one embodiment of the present invention and shown attached to a seat bushing.

Fig. 2 is a horizontal sectional view taken on the line 2—2 of Fig. 1.

Fig. 3 is a longitudinal sectional view of an open type cage with another embodiment of my invention incorporated therein.

Fig. 4 is a horizontal sectional view taken on the line 4—4 of Fig. 3.

Fig. 5 is a view similar to Fig. 4, but illustrating a further modification.

Fig. 6 is a plan view of a spring ring retainer formed of strip material and shown associated with a pair of guide members to indicate the manner in which the retainer would hold such guide members in the cage.

Fig. 7 is a side elevation of the retainer with the guide members shown in section.

Referring to Figs. 1 and 2, 6 designates a closed-type metal cage or shell of tubular construction and provided at its upper end portion with threads for attachment to other pump parts, not shown. The lower end portion is preferably provided with internal threads 8 for engagement with the threaded nipple 9 of a seat retaining part 10.

Intermediate the threaded extremities, the cage bore is enlarged between upper and lower internal shoulders 11 and 12, as indicated at 13, for the reception of opposed guide members 14, two or more of which may be used. In accordance with the invention each guide member may be in the form of a strip of any suitable material which extends lengthwise of the cage. The strip is of segmental shape in cross section and has an arcuate outer surface 15 abutting the surface of the larger portion 13 of the bore to prevent movement of the guide member away from the axis of the cage. The inner surface 16 of each member is also preferably arcuate to serve as a guide for an active element 17, such as the ball illustrated, or a drop (not shown), as it travels up and down in the cage.

The ends of each guide member may be at right angles to the axis of the cage, so as to abut the shoulders 11 and 12 and prevent lengthwise movement of said member.

Each guide member is advantageously constructed with a protruding abutment 18 between its ends, and as the abutment projects toward the axis of the cage, two or more of such abutments will form a stop to limit upward movement of the ball or drop. They also facilitate the removable anchoring of the guide members in operative position. For example, if the guide members are formed of rubber-like elastic material, such as one of the Hycars, each abutment may be provided with a hole 19 for the reception of an end of a rigid metal pin 20 or its equivalent, used to hold the guide members in the shell.

The invention may be employed in connection with a known type of valve seat 21, of the kind having an external flange 22 that is clamped in position by the threaded parts at the lower end of the cage. If such a structure is employed, it is obvious that the parts may be readily assembled or dismantled because disconnection of the parts 6 and 10 will allow the seat 21 and active element 17 to be withdrawn through the lower end of the cage. Then the retaining pin 20 and guide members 14 can be expeditiously detached and removed through the same end of the cage. It is evident that the parts may be assembled by reversing such procedure.

If the guide members are elastic it is manifest that the shocks caused by reciprocation of the active element will be absorbed and therefore the guide means should last much longer.

In the embodiment of the invention illustrated in Figs. 3 and 4, the cage 23 is of the open-type and has a dome top 24 from which a threaded nipple 25 projects upwardly. Slots 26 in the top portion of the cage permit fluid flowing upwardly through the cage to be discharged therefrom. In this modification the parts below the shoulder 11a may be identically the same as the parts below the shoulder 11. However, in Figs. 3 and 4, I have shown similar guide members 27 of hard metal instead of resilient composition, and therefore the retaining means is slightly modified. In this example, each guide member may be provided, at the face of its protrusion, with a horizontal groove 28 for the reception of a split resilient metal ring 29, and the ring may be notched, as shown at 30, for the reception of the guide members. This construction will prevent the guide members from shifting circumferentially relatively to one another, while the internal shoulders of the cage prevent longitudinal movement of the guide members.

In the modification shown in Fig. 5, the split resilient retaining ring 31 fits in grooves in the guide members 32 and protuberances 33 are struck from the ring at spaced points circumferentially of the latter to engage opposite sides of the guide members and prevent them from shifting circumferentially relative to one another.

It will be understood that the retaining means shown in Figs. 3 to 5, inclusive, may be substituted for the retaining pin shown in Figs. 1 and 2, if desired.

In the modification shown in Figs. 6 and 7, the retainer 34 is formed from a strip of resilient metal and the strip is bent at diametrically opposite places, as indicated at 35, for the reception of the upper ends of the guide members 36. Obviously, the retainer functions to hold the guide members against the inner surface of the bore of the cage, not shown. If a spring ring of this type is employed, it can be inserted from the lower or seat end of the cage, and the guide members can thus be pushed in place, by hand without the use of tools.

From the foregoing, it will be apparent that whether the cage is of open or closed type, it may be made of a single piece of suitable metal or the like and from the upper internal shoulder to the lower end, the construction will be the same. With such a cage, I may employ the resilient rubber-like guide members shown in Figs. 1 and 2, or the rigid guide members illustrated in Figs. 3 to 5, inclusive, and may also employ various retaining means for holding the members in place. Furthermore, by using a conventional valve seat at the lower end portion of the cage, I can readily remove the guide members and retaining means through the lower end of the cage, after detaching the valve seat from the cage.

While I have disclosed what I now consider to be some preferred embodiments of the invention in such manner that the same may be readily understood by those skilled in the art, I am aware that changes may be made in the details disclosed without departing from the spirit of the invention, as expressed in the following claims.

What I claim and desire to secure by Letters Patent is:

1. A valve assembly for deep well pumps comprising, a rigid metal cage, an annular shoulder within the cage at one end thereof, a second annular shoulder within the cage adjacent the other end thereof, a cylindrical wall surface in the cage intermediate said shoulders, a plurality of flexible and resilient guide members each having a length substantially equal to the space between said shoulders, an arcuate outer surface on each guide member engaging said cylindrical surface, said guide members each having a curved inner surface, a resilient abutment projecting from the inner surface of each guide member, an angular under-surface on each abutment inclined upwardly from the horizontal in proceeding towards the axis of the cage, and means retaining the outer surfaces of the guide members adjacent said cylindrical surface.

2. A valve assembly for deep well pumps comprising, a rigid cage, an annular shoulder within the cage adjacent the upper end thereof, a second annular shoulder within the cage adjacent the lower end thereof, a cylindrical wall within the cage intermediate said shoulders, two flexible and resilient guide members each having a length substantially equal to the space between the shoulders, an arcuate outer surface on each guide member engaging said cylindrical surface, said guide members each having a curved inner surface, an integral abutment projecting from the inner surface of each guide member intermediate the ends thereof, a sloping under-surface on each abutment inclined upwardly from the horizontal in proceeding towards the axis of the cage, and a resilient ring engaging the inner surface of said guide members above said abutments retaining the outer surfaces of the guide members adjacent said cylindrical surface.

3. A valve assembly for deep well pumps comprising, a rigid cage, an annular shoulder within the cage adjacent the upper end thereof, a second annular shoulder within the cage adjacent the lower end thereof, a cylindrical wall within the cage intermediate said shoulders, two flexible and resilient guide members each having a length substantially equal to the space between the shoulders, an arcuate outer surface on each guide member engaging said cylindrical surface, said guide members each having a curved inner surface, an integral abutment projecting from the inner surface of each guide member intermediate the ends thereof, a sloping under-surface on each abutment inclined upwardly from the horizontal in proceeding towards the axis of the cage, a split resilient ring member, said ring member having diametrically opposite disposed notches therein for receiving the guide members whereby the split resilient ring holds the guide members against said cylindrical surface of the cage and prevents circumferential displacement of one guide member relative to the other.

4. A valve for deep well pumps comprising, a one-piece rigid cage, flexible and resilient guide members arranged in said cage and extending lengthwise thereof, means in the cage and associated therewith preventing the guide members from moving axially of the cage and away from the axis thereof, an active member in the cage guided by said guide members, a seat for the active member within the cage, an inwardly projecting abutment carried by each guide member intermediate the ends thereof limiting movement of the active member axially of the cage, and means detachably engaging said guide members removably retaining the guide members in the cage.

5. A valve for deep well pumps comprising, a rigid cage, resilient guide members removably arranged in the cage and extending lengthwise thereof, means in the cage preventing the guide members from moving axially of the cage and away from the axis thereof, an active member in the cage guided by said guide members and limited in axial movement, a seat for the active member within the cage, means detachably engaging said guide members and removably retaining them in the cage, and abutment means within the cage limiting movement of the active member away from said seat.

6. In a valve assembly for deep well pumps, a rigid hollow cage, a plurality of circumferentially spaced resilient guide members extending lengthwise within the cage with outer surfaces of the guide members lying along the interior of the hollow rigid cage and maintained therealong, a valve seat within the cage, an active member movable lengthwise of the cage between the guide members into seating engagement with the valve seat and away from the valve seat, means limiting movement of the active member away from the valve seat, and the inner surfaces of said guide members guiding said active member during said movements thereof.

7. In a valve assembly for deep well pumps, a cage having a rigid hollow portion, a shoulder within the hollow portion of the cage, a second shoulder within the hollow portion of the cage spaced from the first shoulder, a plurality of circumferentially spaced resilient rubber guide members with the ends of the guide members engaging said shoulders, outer surfaces of the guide members lying along and maintained in engagement with the interior of the hollow portion between said shoulders, a valve seat within the cage adjacent one end of the guide members, a ball within the cage guided in its movement away from and towards said valve seat by said resilient guide members which absorb impacts of the ball without being deformed beyond the elastic limit of the resilient guide members, and means limiting movement of the ball away from said valve seat.

8. In a valve assembly for deep well pumps, a rigid hollow cage, a plurality of resilient guide members extending lengthwise within the cage with outer surfaces of the guide members in engagement with the interior of the hollow rigid cage, means preventing lengthwise movement of the guide members relative to the cage, means maintaining the outer surfaces of said guide members in engagement with the interior of the hollow rigid cage, a valve seat within the cage, a ball movable lengthwise of the cage between the guide members into seating engagement with the valve seat and away from the valve seat, the inner surfaces of said guide members guiding said ball during said movements, and resilient abutment means limiting movement of the ball away from the valve seat.

9. A valve assembly for deep well pumps comprising, a metal cage having a rigid tubular portion, an annular upper shoulder within the tubular portion of the cage, a second annular lower shoulder within the tubular portion of the cage, a cylindrical wall surface within the cage intermediate said shoulders, resilient rubber guide members with the ends thereof engaging said shoulders, an arcuate outer surface on each guide member lying along the cylindrical wall surface of the cage, a valve seat adjacent the lower ends of the guide members, a ball guided in its movement towards and away from the valve seat by inner surfaces of the guide members, means adjacent the upper ends of the guide members maintaining the outer surfaces thereof along the cylindrical wall of the cage, and abutment means adjacent the upper ends of the guide members limiting upward movement of the ball.

10. A valve for deep well pumps comprising, a rigid one-piece hollow cage, guide members removably arranged within the cage and extending lengthwise thereof, means in the cage preventing the guide member for moving axially of the cage, said guide members lying along an interior surface of the hollow cage and prevented from moving away from the axis of the cage, a valve seat within the cage, an active member in the cage guided by said guide members in its movement towards and away from the valve seat, a resilient ring engaging said guide members and urging them outwardly into engagement with the interior of the hollow cage, and abutment means within the cage limiting movement of the active member away from the valve seat.

JOHN N. MARTIN.

REFERENCES CITED

The following references are of record in the file of this patent:

UNITED STATES PATENTS

| Number | Name | Date |
| --- | --- | --- |
| 1,160,707 | Garber | Nov. 16, 1915 |
| 1,756,225 | Thurstensen | Apr. 29, 1930 |
| 1,861,674 | Winterhoff | June 7, 1932 |
| 1,901,217 | Yerkes | Mar. 14, 1933 |
| 2,085,360 | Hammett | June 29, 1937 |
| 2,137,402 | Hoferer | Nov. 22, 1938 |